United States Patent
Ueki

(10) Patent No.: US 10,421,369 B2
(45) Date of Patent: Sep. 24, 2019

(54) VEHICLE REFRESH CHARGE CONTROL DEVICE

(71) Applicant: Nobukazu Ueki, Toyota (JP)

(72) Inventor: Nobukazu Ueki, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 183 days.

(21) Appl. No.: 15/101,781

(22) PCT Filed: Oct. 15, 2014

(86) PCT No.: PCT/JP2014/077407
§ 371 (c)(1),
(2) Date: Jun. 3, 2016

(87) PCT Pub. No.: WO2015/083444
PCT Pub. Date: Jun. 11, 2015

(65) Prior Publication Data
US 2016/0303985 A1    Oct. 20, 2016

(30) Foreign Application Priority Data
Dec. 4, 2013    (JP) .................... 2013-251491

(51) Int. Cl.
*B60L 53/00*    (2019.01)
*H02J 7/14*    (2006.01)
(Continued)

(52) U.S. Cl.
CPC .............. *B60L 53/00* (2019.02); *B60L 58/13* (2019.02); *H02J 7/0075* (2013.01);
(Continued)

(58) Field of Classification Search
CPC ................................................. B60L 11/1809
(Continued)

(56) References Cited

U.S. PATENT DOCUMENTS

| | | | | |
|---|---|---|---|---|
| 6,483,272 B1* | 11/2002 | Terada | ................ | B60L 11/185 320/103 |
| 6,535,112 B1* | 3/2003 | Rothschink | .......... | G01M 15/05 324/402 |
| 6,653,819 B2* | 11/2003 | Nagata | ................. | H02J 7/1446 320/130 |
| 2002/0014879 A1* | 2/2002 | Koike | ................... | H02J 7/0075 320/133 |
| 2002/0129645 A1* | 9/2002 | Konno | .................... | F01M 1/18 73/114.57 |

(Continued)

FOREIGN PATENT DOCUMENTS

EP    1 257 033 A2    11/2002
JP    9-37479 A    2/1997
(Continued)

OTHER PUBLICATIONS

International Search Report dated Jan. 13, 2015 in PCT/JP2014/077407 Filed Oct. 15, 2014.

*Primary Examiner* — Jerry D Robbins
(74) *Attorney, Agent, or Firm* — Oblon, McClelland, Maier & Neustadt, L.L.P.

(57) ABSTRACT

A charge control apparatus includes a control device configured to execute a refresh charge to fully charge a battery upon a predetermined refresh charge start condition being met, and execute a predetermined control according to a vehicle travel state under a situation where the control device does not execute the refresh charge, the predetermined control involving at least one of charging and discharging the battery. The control device suppresses the refresh charge when the control device detects at least one of a predetermined input from an external device and a predetermined vehicle operation.

10 Claims, 8 Drawing Sheets

(51) Int. Cl.
*H02J 7/00* (2006.01)
*B60L 58/13* (2019.01)
*H01M 10/44* (2006.01)
*H01M 10/48* (2006.01)
*H02J 7/04* (2006.01)

(52) U.S. Cl.
CPC ......... *H02J 7/1446* (2013.01); *B60L 2210/10* (2013.01); *B60L 2240/80* (2013.01); *H01M 10/44* (2013.01); *H01M 10/48* (2013.01); *H02J 7/041* (2013.01); *H02J 7/1492* (2013.01); *Y02T 10/705* (2013.01); *Y02T 10/7005* (2013.01); *Y02T 10/7044* (2013.01); *Y02T 10/92* (2013.01)

(58) Field of Classification Search
USPC .......................................................... 320/109
See application file for complete search history.

(56) References Cited

U.S. PATENT DOCUMENTS

| | | | |
|---|---|---|---|
| 2002/0167296 A1 | 11/2002 | Nagata et al. | |
| 2009/0005911 A1* | 1/2009 | Decroix | E06B 9/72 |
| | | | 700/275 |

FOREIGN PATENT DOCUMENTS

| | | |
|---|---|---|
| JP | 11-308778 A | 11/1999 |
| JP | 2001-268806 A | 9/2001 |
| JP | 2001-338696 A | 12/2001 |
| JP | 2002-17049 A | 1/2002 |
| JP | 2003-31267 A | 1/2003 |
| JP | 2003-257498 A | 9/2003 |
| JP | 2011-140389 A | 7/2011 |

* cited by examiner

FIG.1
(A)
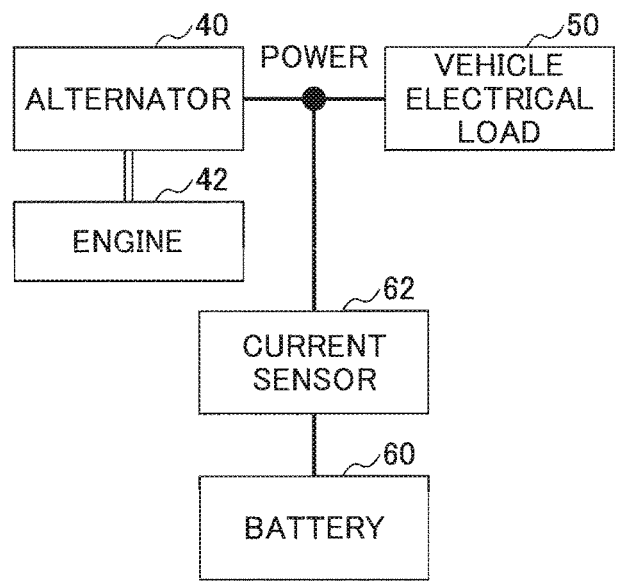
(B)
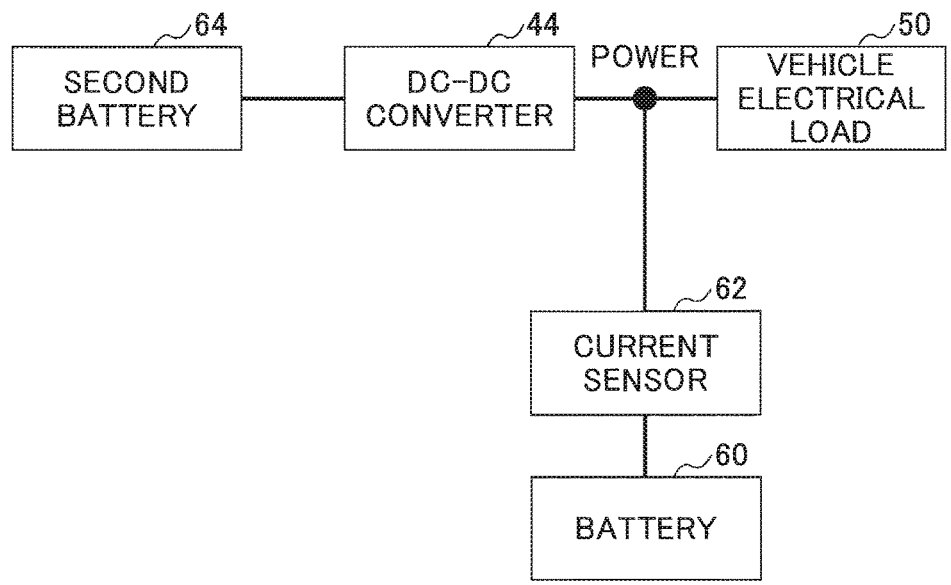

VEHICLE REFRESH CHARGE CONTROL DEVICE

TECHNICAL FIELD

The disclosure is related to a charge control apparatus.

BACKGROUND ART

An information process apparatus driven by a battery is known in which a control part is provided to charge the battery after discharging the battery based on a charge instruction.

CITATION LIST

Patent Literature 1

[PTL 1]
Japanese Laid-open Patent Publication No. 09-037479

SUMMARY

Technical Problem

By the way, there may be a case where a refresh charge is performed to fully charge a battery in order to preserve service life of the battery. During the execution of the refresh charge, charge control and idling stop control are prevented. However, because it is not possible to determine whether the refresh charge is being performed from the outside, if the charge control or the idling stop control is not performed due to the execution of the refresh charge in situation where the charge control or the idling stop control would otherwise be performed, there is a problem that an inspector cannot easily determine whether the charge control or the idling stop control is not performed due to the execution of the refresh charge or due to other reasons such as a failure.

Solutions to this problem may be such that an execution state of the refresh charge is displayed on a display device or event history of the refresh charge is recorded as diagnosis information that can be read with a diagnosis tool. However, such solutions may lead to problems such as additional cost or increased number of communication items.

Therefore, an object of the present disclosure is to provide a charge control apparatus, with a different approach with respect to solutions described above, which enables an inspector to easily determine whether a reason why a charge control, etc., is not performed is a refresh charge.

Solution to Problem

According to an aspect of the present disclosure, a charge control apparatus is provided, comprising a control device configured to execute a refresh charge to fully charge a battery upon a predetermined refresh charge start condition being met, and execute a predetermined control according to a vehicle travel state under a situation where the control device does not execute the refresh charge, the predetermined control involving at least one of charging and discharging the battery, wherein the control device suppresses the refresh charge when the control device detects at least one of a predetermined input from an external device and a predetermined vehicle operation.

Advantageous Effects of Invention

According the present disclosure, a charge control apparatus is obtained which enables an inspector to easily determine whether a reason why a charge control, etc., is not performed is a refresh charge.

BRIEF DESCRIPTION OF DRAWINGS

FIG. 1 is a diagram illustrating a configuration of a Power supply system of a vehicle according an embodiment.

DESCRIPTION OF EMBODIMENTS

Figure 2:
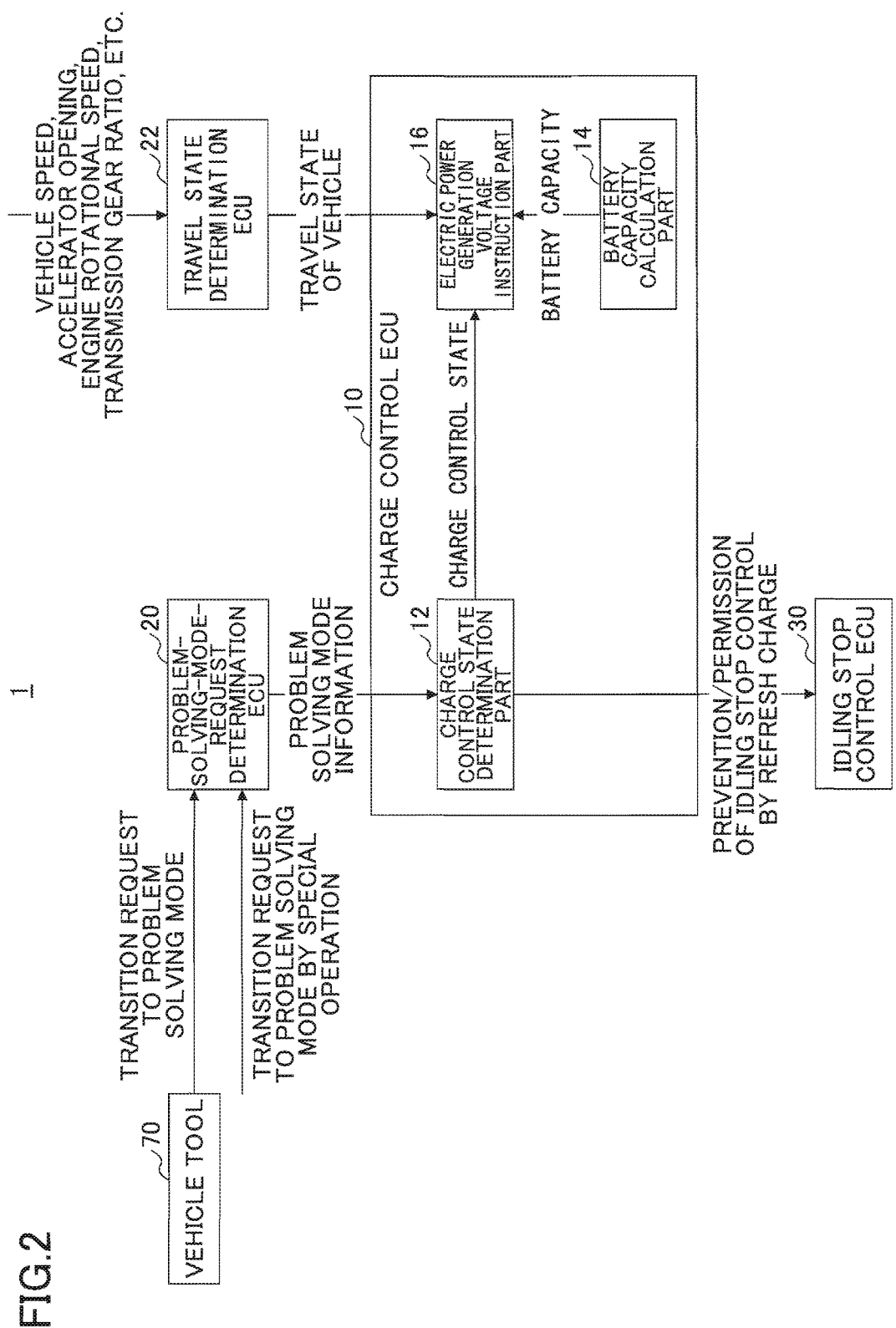
FIG. 2 is a diagram illustrating a system configuration of a control system of a vehicle according an embodiment.

In the following, embodiments are described in detail with reference to appended drawings.

FIG. 1 is a diagram illustrating a configuration of a power supply system of a vehicle according an embodiment, in which (A) illustrates a configuration of a single battery type and (B) illustrates a configuration of a two-battery type. The embodiment is suited for a vehicle that has only an engine installed (i.e., other than hybrid vehicles and electric vehicles), as illustrated in FIG. 1 (A). In a configuration illustrated in FIG. 1 (A), an alternator is mechanically connected to an engine 42. The alternator 40 is a generator that generates electricity based on power of the engine 42. The electric power generated by the alternator 40 is utilized for charging a battery 60 and driving vehicle loads 50. It is noted that a current sensor is provided for the battery 60. The current sensor 62 detects a battery current (i.e., a charge current to the battery 60 and a discharge current from the battery 60). Typically, the battery 60 is lead acid battery; however, other types of batteries (or capacitors) may be used. The vehicle loads 50 are arbitrary, and includes a starter, an air conditioner, a wiper, etc. in such a configuration of a single battery type, by controlling a voltage generated by the alternator 40, a SOC (State Of Charge) of the battery 60 can be controlled.

However, the embodiment is also applicable to a configuration of a two-battery type as illustrated in FIG. 1 (B). Such a configuration of a two-battery type may be used in a vehicle that has only an engine, a hybrid vehicle, and an electric vehicle. Specifically, a second battery 64 whose voltage is higher than that of the battery 60, and a DC-DC converter 44 is provided between the second battery 64 and the battery 60. In this case, vehicle electrical loads 50 may be provided on only the battery 60 side as illustrated;

however, a part of the vehicle electrical loads 50 may be provided on the second battery 64 side. In such a configuration of a two-battery type, by controlling an output voltage of the DC-DC converter 44, the SOC of the battery 60 can be controlled. It is noted that, in the case of the vehicle that has only an engine, a configuration of a two-battery type may be implemented by providing a second battery in parallel to the battery 60 in the configuration illustrated in FIG. 1 (A).

It is noted that, in the following, as an example, an explanation is made based on a premise that the configuration illustrated in FIG. 1 (A) is used.

FIG. 2 is a diagram illustrating a system configuration of a control system of a vehicle according an embodiment.

A control system 1 includes a charge control ECU (Electronic Control Unit) 10, a problem solving mode request determination ECU 20, a travel state determination ECU 22, and an idling stop control ECU 30. It is noted that connections between elements in FIG. 2 are arbitrary. For example, the connection ways may include a connection via a bus such as a CAN (Controller Area Network), etc., an indirect connection via another ECU, etc., a direct connection, and a connection that enables wireless communication. It is noted that sections of the functions of the ECUs are arbitrary, and a part or all of the functions of a particular ECU may be implemented by another ECU (which may include an ECU not illustrated). For example, a part of functions of the charge control ECU 10 may be implemented by the problem solving mode request determination ECU 20 and/or the vehicle wheel sensors 30, or reversely a part of or all of functions of the problem solving mode request determination ECU 20 and/or vehicle wheel sensors 30 may be implemented by the charge control ECU 10.

The charge control ECU 10 may be implemented by an engine ECU for controlling the engine, for example. The charge control ECU 10 includes a charge control state determination part 12, a battery capacity calculation part 14, and a electric power generation voltage instruction part 16.

The problem solving mode request determination ECU 20 detects a demand for a transition to the problem solving mode. The demand for a transition to the problem solving mode may be input in an arbitrary way. For example, in the illustrated example, the demand for a transition to the problem solving mode is received via communication from a vehicle tool 70. The vehicle tool 70 is typically an external device that is not mounted in the vehicle, and is a portable device maintained in a vehicle maker, dealers, maintenance facilities, etc. The inspector, when he/she wants to transit to the problem solving mode, connects the vehicle tool 70 to the vehicle and performs a predetermined operation to generate and input the demand for a transition to the problem solving mode. It is noted that a connection between the vehicle tool 70 and the vehicle is arbitrary, such as a connection using an on-vehicle LAN (Local-Area Network), etc., or a connection via wireless communication. Further, the demand for a transition to the problem solving mode may be generated by a special operation that would not be normally performed by drivers. The special operation is arbitrary, and may be a series of operations such as two-times accelerator pedal pressing, two-times brake pedal pressing, and two-times accelerator pedal pressing, for example.

It is noted that the inspector typically performs the operation to demand a transition to the problem solving mode in order to determine, on the actual vehicle, whether the charge control is performed in a situation in which the charge control is to be performed. The charge control may not be performed in the refresh charge state or in a predetermined case other than the refresh charge state, as described hereinafter. The problem solving mode exists for identifying the reason why the charge control (and the idling stop control described hereinafter) is not performed.

When the problem solving mode request determination ECU 20 detects the demand for a transition to the problem solving mode, the problem solving mode request determination ECU 20 transmits information (problem solving mode information) representing the fact to a relevant ECU (the charge control ECU 10 in this example). The problem solving mode information may be in a form of a flag. The problem solving mode information is kept until a predetermined end condition is met. The predetermined end condition is arbitrary, and may be met when the engine 42 (or an ignition switch) is transitioned to an OFF state. Alternatively, the predetermined end condition may be met when an demand for ending the problem solving mode is detected. The demand for ending the problem solving mode may be input via the vehicle tool 70 or via the special operation, as is the case with the demand for a transition to the problem solving mode.

The travel state determination ECU 22 determines a travel state of the vehicle cased on a vehicle speed, an accelerator opening, an engine rpm, a transmission gear ratio, etc. The travel state of the vehicle includes a stop state, an acceleration state, a constant vehicle speed state, a deceleration state, etc.

The idling stop control ECU 30 performs the idling stop control. The details of the idling stop control are arbitrary. Typically, the idling stop control stops the engine 42 when a predetermined idling stop start condition is met in the vehicle stop state or the traveling state, and then restarts the engine 42 when a predetermined idling stop end condition is met. The predetermined idling stop start condition includes not being in the refresh charge state. Specifically, the idling stop control is prevented and thus is not performed in the refresh charge state. The traveling state is in a vehicle speed range in which the idling stop control can be appropriately performed, and may be a low-speed traveling state less than or equal to 13 km/h, for example.

Next, the charge control state determination part 12, the battery capacity calculation part 14, and the electric power generation voltage instruction part 16 of the charge control ECU 10 are explained.

Figure 3:
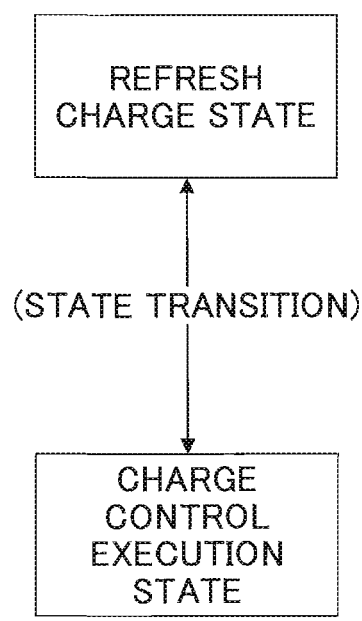
FIG. 3 is a diagram illustrating a state transition in a charge control state determination part 12.

FIG. 3 is a diagram illustrating a state transition in the charge control state determination part 12. The charge control state determination part determines a charge control state transitioning between the refresh charge state and the charge control execution state, as illustrated in FIG. 3. It is noted that the charge control execution state consists of two states illustrated; however, the charge control execution state may include three or more states (see FIG. 4 (B)). The refresh charge state is implemented when predetermined refresh charge start condition is met in the charge control execution state, and continued until a predetermined refresh charge end condition is met. When the predetermined refresh charge end condition is met, the charge control execution state is restored.

The predetermined refresh charge start condition and predetermined refresh charge end condition are arbitrary. For example, the refresh charge start condition may be met when a predetermined time has lapsed from the latest execution of the refresh charge or when a cumulative charge/discharge electricity amount [As] from the latest execution of the refresh charge exceeds predetermined threshold. Further, the refresh charge start condition may be met when a battery voltage at the time of starting the engine 42 is below a predetermined value (i.e., an internal resistance of the battery 60 is high and thus degradation is predicted), etc. It is noted that the degradation of the battery 60 may be determined using a change amount of the SOC, a temperature histogram, a capacity histogram, etc., of the battery 60 at the time of charging the battery 60 for a predetermined time. It is noted that the cumulative charge/discharge electricity amount may be a time-integrated value of the charge current and the discharge current such that the charge current and the discharge current are integrated with absolute values thereof. The cumulative charge/discharge electricity amount can be calculated based on the detection value of the current sensor 62. The refresh charge end condition may be met when the battery 60 is brought to a predetermined excessive charged state (an excessive charged state necessary to preserve the service life).

Figure 4:
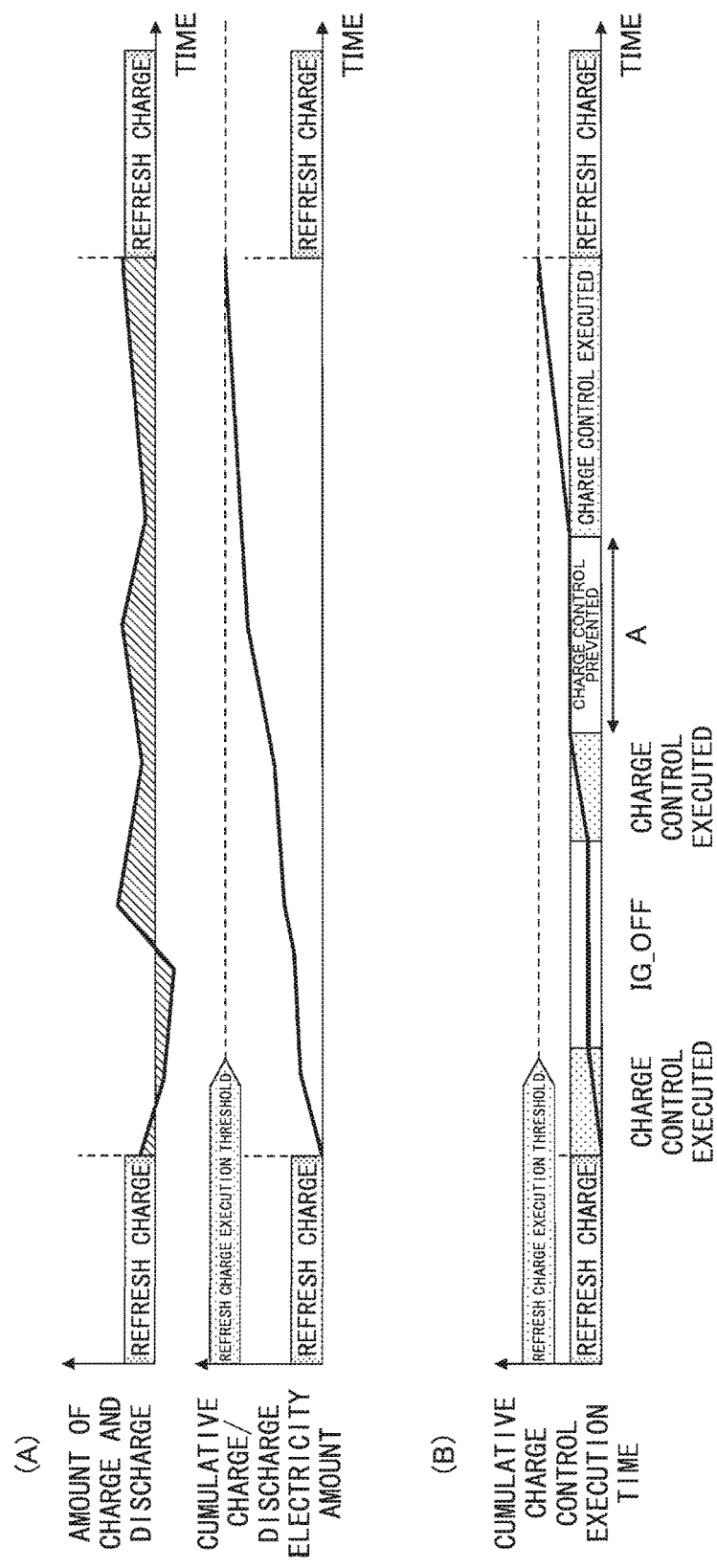
FIG. 4 is a diagram explaining an example of a refresh charge start condition.

FIG. 4 is a diagram explaining an example of the refresh charge start condition in which (A) is a diagram explaining the refresh charge start condition based on the cumulative charge/discharge electricity amount, and (B) is a diagram explaining the refresh charge start condition based on an elapsed time (cumulative charge control execution time) from the latest execution of the refresh charge.

As illustrated in FIG. 4 (A), an initial value of the cumulative charge/discharge electricity amount immediately after the completion of the refresh charge is 0, and then gradually increases as the charge/discharge occurs. Then, when the cumulative charge/discharge electricity amount reaches a predetermined threshold (i.e., a refresh charge execution threshold), the refresh charge start condition is met, which causes the refresh charge to be started. The refresh charge execution threshold related to the cumulative charge/discharge electricity amount may be arbitrary, but is set in terms of preserving the service life of the battery 60. For example, the refresh charge execution threshold related to the cumulative charge/discharge electricity amount may correspond to a lower limit of a range in which the cumulative charge/discharge electricity amount that substantially affects the service life of the battery 60 could take, and may be adapted based on experiments, etc.

As illustrated in FIG. 4 (B), the elapsed time from the completion of the execution of the refresh charge (i.e., the cumulative charge control execution time) immediately after the completion of the refresh charge is 0, and then gradually increases. In the example illustrated in FIG. 4 (B), the accumulation of the cumulative charge control execution time is performed only during the execution of the charge control. However, the accumulation of the cumulative charge control execution time may be performed during the execution of the idling stop control. When the cumulative charge control execution time reaches a predetermined threshold (i.e., refresh charge execution threshold), the refresh charge start condition is met, which causes the refresh charge to be started. Similarly, the refresh charge execution threshold related to the cumulative charge control execution time may be arbitrary, but is set in terms of preserving the service life of the battery 60. For example, the refresh charge execution threshold related to the cumulative charge control execution time may correspond to a lower limit of a range in which the cumulative charge control execution time that substantially affects the service life of the battery 60 could take, and may be adapted based on experiments, etc.

It is noted that, in the example illustrated in FIG. 4 (B), the prevented state of the charge control (see section A) is implemented. In the prevented state of the charge control, the power generation voltage of the alternator 40 is controlled such that the SOC of the battery 60 becomes a predetermined value. The predetermined value may be equal to a constant value α (see FIG. 5) used in the charge control described hereinafter. It is noted that a similar prevented state of the charge control is implemented in the refresh charge state; however, the prevented state of the charge control may be implemented in a state other than the refresh charge state. For example, the prevented state of the charge control may be implemented when a failure of hardware resources (the failure of the alternator 40, for example) or an abnormality in the temperature of the battery 60 is detected, etc.

The battery capacity calculation part 14 calculates the SOC of the battery 60 based on the detection values of the current sensor 62, etc. A concrete way of calculating the SOC of the battery 60 may be arbitrary. The temperature of the battery may be considered to calculate the SOC battery 60.

The electric power generation voltage instruction part 16 determines the power generation voltage (its target value) of the alternator 40 based on the charge control state determined in the charge control state determination part 12, the SOC of the battery 60 calculated in the battery capacity calculation part 14, and the vehicle travel state determined in the travel state determination ECU 22.

Figure 5:
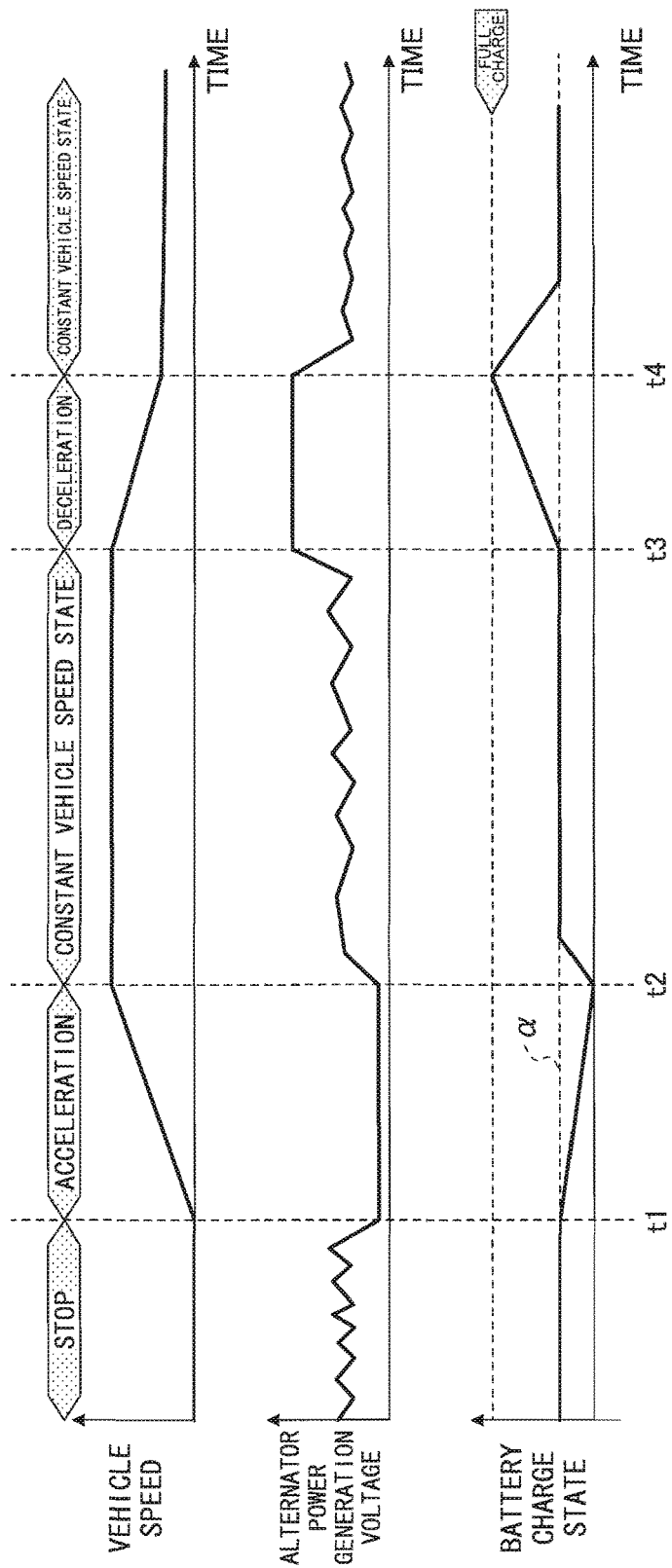
FIG. 5 is a diagram illustrating an example of a way (charge control way) of determining an power generation voltage of an alternator 40 according to a vehicle travel state, etc., in a case where a charge control state is a charge control execution state.

FIG. 5 is a diagram illustrating an example of a way (charge control way) of determining a power generation voltage of the alternator 40 according to the vehicle travel state, etc., in a case where the charge control state is the charge control execution state. In FIG. 5, from an upper side, the vehicle travel state (the vehicle speed) the power generation of the alternator 40, and the SOC of the battery 60 are illustrated in time series.

In the example illustrated in FIG. 5, in the vehicle stop state before time point t1 (and the constant speed travel state from time point t2 to time point t3, and after time point t4), the power generation of the alternator 40 is controlled such that the SOC of the battery 60 becomes a constant value α (<100%). It is noted that, if the idling stop control is performed in the vehicle stop state, the alternator 40 is stopped during a period in which the idling stop control is performed. In the acceleration state from time point t1 to time point t2, the power generation is suppressed in order to enhance the acceleration characteristics. As a result of this, the SOC of the battery 60 is reduced. In the deceleration state from time point t3 to time point t4, the regenerative power generation is performed to increase the SOC of the battery 60.

Figure 6:
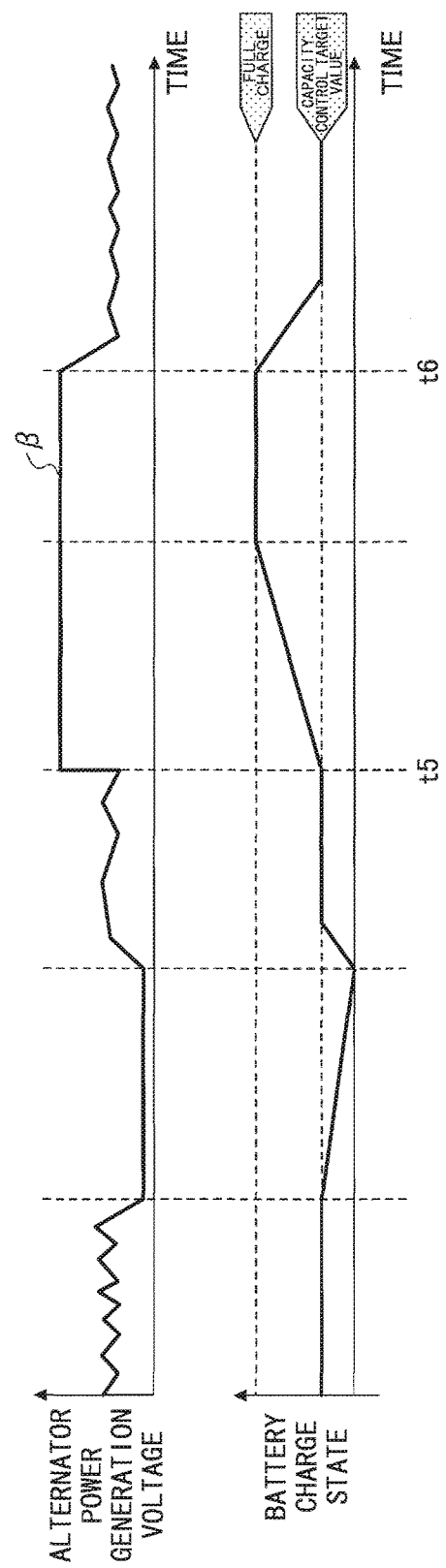
FIG. 6 is a diagram illustrating an example of a way (refresh charge control way) of determining the power generation voltage of the alternator 40 in a case where the charge control state is a refresh charge control state.

FIG. 6 is a diagram illustrating an example of a way (refresh charge control way) of determining the power generation voltage of the alternator 40 in a case where the charge control state is the refresh charge control state. In FIG. 6, from an upper side, the power generation of the alternator 40, and the SOC of the battery 60 are illustrated in time series.

In the example illustrated in FIG. 6, the charge control state transitions from the charge control execution state to the refresh charge state at time point t5. Specifically, at time point t5, the predetermined refresh charge start condition is met, and thus the refresh charge is started. In the refresh charge state, the power generation of the alternator 40 is kept at a predetermined value β. The predetermined value β is the power generation of the alternator 40 that can implement the power generation appropriately. As a result of this, the SOC of the battery 60 increases to be in the full charged state or excessive charged state, which causes ending the refresh charge. When the refresh charge is completed at time point t6 (i.e., the predetermined refresh charge end condition is met), the charge control state transitions from the refresh charge state to the charge control execution state.

It is noted that, in the case where the battery 60 is a lead acid battery, in particular, the service life of the battery 60 is extended most effectively if the battery 60 is used while being kept at the full charged state. However, keeping the battery 60 at the full charged state requires the alternator 40 to constantly generate the electricity (with a constant electric power generation voltage), which is not desirable in terms of the fuel economy. Therefore, the charge control described above is performed. On the other hand, when the charge control is performed, as illustrated in FIG. 5, the SOC of the battery 60 deviates from its full charged state for increased time and may vary relatively greatly, which is not desirable in terms of the service life of the battery 60. Concerning this point, according to the embodiment, the charge control is performed while the refresh charge is performed in the predetermined case, which enables extending the service life of the battery 60.

Figure 7:
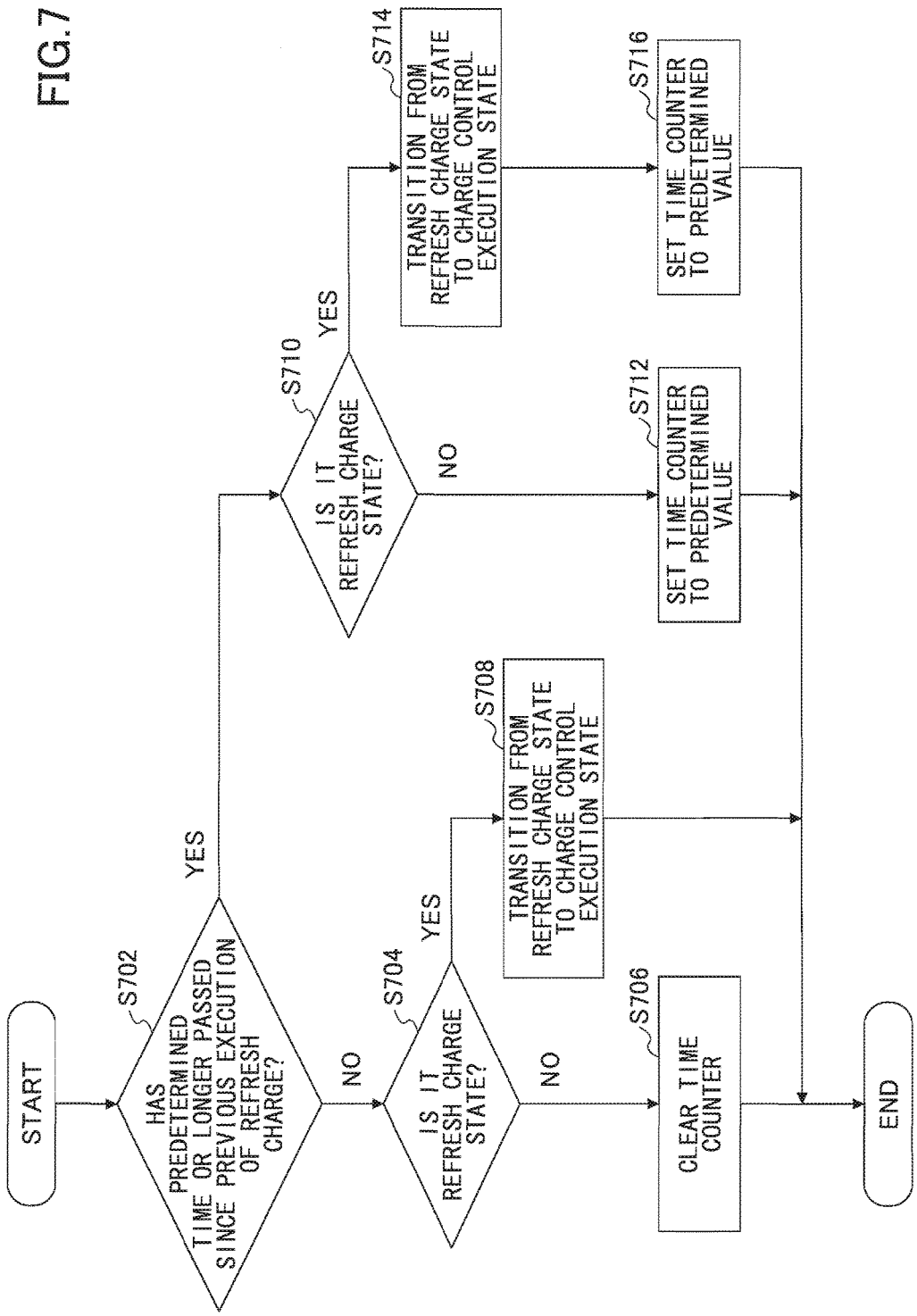
FIG. 7 is a flowchart illustrating an example of a process executed by a charge control ECU 10 when a demand for a transition to a problem solving mode is detected.

FIG. 7 is a flowchart illustrating an example of a process executed by the charge control ECU 10 at the time of the detection of the demand for a transition to the problem solving mode. The process routine illustrated in FIG. 7 is initiated upon the demand for the transition to the problem solving mode being detected in the ON state of the ignition switch. Specifically, the process routine illustrated in FIG. 7 is performed once at the time of the transition to the problem solving mode.

In step S702, the charge control ECU 10 determines, based on a counter value of a time counter, whether the elapsed time from the latest execution of the refresh charge is greater than or equal to a predetermined time Ts. The time counter is reset to an initial value 0 after the execution of the refresh charge, and then is incremented according to the elapsed time therefrom. Here, the time counter represents the cumulative charge control execution time. The predetermined time Ts is smaller than the threshold related to the refresh charge start condition (see the refresh charge execution threshold related to the cumulative charge control execution time illustrated in FIG. 4 (B)). For example, the difference between the predetermined time Ts and the threshold related to the refresh charge start condition may correspond to a maximum value of a range in which the time required for the problem solving mode could take, and may be adapted based on experiments. If the elapsed time from the latest execution of the refresh charge is greater than or equal to the predetermined time Ts, the process goes to step S710, otherwise the process goes to step S704.

In step S704, the vehicle control ECU 10 determines whether the current control state is the refresh charge state. If the current control state is the refresh charge state, the process routine goes to step 708, otherwise the process routine goes to step 706.

In step S706, the charge control ECU 10 clears the time counter (i.e., resets to its initial value 0). As a result of this, it become possible to reduce a probability that the transition to the refresh charge state occurs in the problem solving mode due to the time counter exceeding the refresh charge execution threshold.

In step S708, the vehicle control ECU 10 causes the transition from the refresh charge state to the charge control execution state. As a result of this, it become possible to stop the refresh charge state in the problem solving mode. It is noted that, even according to step S708, there may be a case where the transition from the refresh charge state to the charge control execution state cannot be implemented due to factors other than the refresh charge (for example, in the case where the prevented state of the charge control is implemented) other words, there is a probability that the charge control is not performed in the problem solving mode due to factors other than the refresh charge.

It is noted that, the process routine after step S708 may end directly, as illustrated in FIG. 7; but may end after performing the process step S706.

In step S710, the vehicle control ECU 10 determines whether the current control state is the refresh charge state. If the current control state is the refresh charge state, the process routine goes to step 714, otherwise the process routine goes to step 712.

In step S712, the vehicle control ECU 10 sets the time counter to a predetermined value. Preferably, the predetermined value is the same as the predetermined time Ts used in step S702 described above. For example, the elapsed time from the latest execution of the refresh charge is greater than the predetermined time Ts, the determination result of step S702 is affirmative, which causes the process routine to go to step S712 where the time counter is set (decreased) to the predetermined value (i.e., the predetermined time Ts). As a result of this, it become possible to reduce a probability that the transition to the refresh charge state occurs in the problem solving mode due to the time counter exceeding the refresh charge execution threshold. On the other hand, since the time counter is not cleared but set to the predetermined value, it become possible to reduce a probability that the refresh charge is not performed over a long period. Specifically, if the time counter is cleared when the elapsed time from the latest execution of the refresh charge is greater than or equal to the predetermined time Ts, the time to the next refresh charge becomes longer, which may leads to an undesired state in terms of the service life. In contrast, setting the time counter to the predetermined value can reduce the probability of such an undesired state.

In step S714, the vehicle control ECU 10 causes the transition from the refresh charge state to the charge control execution state. As a result of this, it become possible to stop the refresh charge state in the problem solving mode. It is noted that, even according to step S714, there may be a case where the transition from the refresh charge state to the charge control execution state cannot implemented due to factors other than the refresh charge (for example, in the case where the prevented state of the charge control is implemented).

In step S716, the vehicle control ECU 10 sets the time counter to a predetermined value. The predetermined value may be the same as the predetermined value in step S712 described above. As a result of this, it becomes possible to reduce the probability of the transition to the refresh charge state in the problem solving mode, while reducing the probability that the refresh charge is not performed over a long period due to the transition to the problem solving mode.

According to the process illustrated in FIG. 7, becomes possible reduce the probability that the charge control is not performed in the problem solving mode due to the refresh charge state. In other words, the refresh charge can be substantially removed from candidates of the factors that cause the charge control not to be performed. As a result of this, it becomes easy to identify the reason why the charge control is not performed. For example, if the inspector inputs the demand for a transition to the problem solving mode in order to identify the reason why the charge control is not performed, the refresh charge is suppressed as described above. As a result of this, the probability is reduced that the charge control is not performed due to the refresh charge state in the problem solving mode during the period in which the vehicle is actually traveling. Thus, if the state in which the charge control is not performed still continues, the inspector can determine that some factors other than the refresh charge are the cause. On the other hand, if the charge control is performed in the problem solving mode, it can be determined that the charge control was not performed due to the refresh charge and not due to other factors such as a failure of the hardware resources.

It is noted that, in the example illustrated in FIG. 7, the counter value of the time counter representing the cumulative charge control execution time is cleared, etc.; however, in addition or instead of it, the cumulative charge/discharge electricity amount may also be cleared, etc. For example, in step S702, it may be determined whether the current cumulative charge/discharge electricity amount is greater than or equal to a predetermined value Cs, in step S706, the cumulative charge/discharge electricity amount is cleared, and in step S712 and in step S716, cumulative charge/discharge electricity amount is set to the predetermined value Cs. The predetermined value Cs is smaller than the threshold related to the refresh charge start condition (see the refresh charge execution threshold related to the cumulative charge/discharge electricity amount illustrated in FIG. 4 (A)). For example, the difference between the predetermined value Cs and the refresh charge execution threshold related to the cumulative charge/discharge electricity amount may correspond to a maximum of a range in which the cumulative charge/discharge electricity amount could increase in the problem solving mode, and may be adapted based on experiments, etc. It is noted that the process flowchart (FIG. 7) for determining the cumulative charge control execution time and the process flowchart for determining the cumulative charge/discharge electricity amount may be performed in parallel or may be unified into a single process flowchart.

Further, in the example illustrated in FIG. 7, as a preferable embodiment, the processes of S702, and step S710 through step S716 are included; however, these processes may be omitted. Further, in the case of the transition to the problem solving mode, the counter value of the time counter representing the cumulative charge control execution time may be cleared at any time or may be set to a predetermined value at any time.

Further, in the example illustrated in FIG. 7, the counter value of the time counter representing the cumulative charge control execution time may be cleared; however, the cumulative charge control execution time may not be incremented in the problem solving mode. In this case, when the problem solving mode is ended, the cumulative charge control execution time is started to be incremented from the value at the time of the start of the problem solving mode. Similarly, the cumulative charge/discharge electricity amount may not be calculated in the problem solving mode. In this case, the refresh charge is substantially completely prevented in the problem solving mode. In this case, when the problem solving mode ended, the cumulative charge/discharge electricity amount is started to be calculated from the value at the time of the start of the problem solving mode. Such a configuration is substantially equivalent to a configuration illustrated in FIG. 8 described hereinafter.

Figure 8:
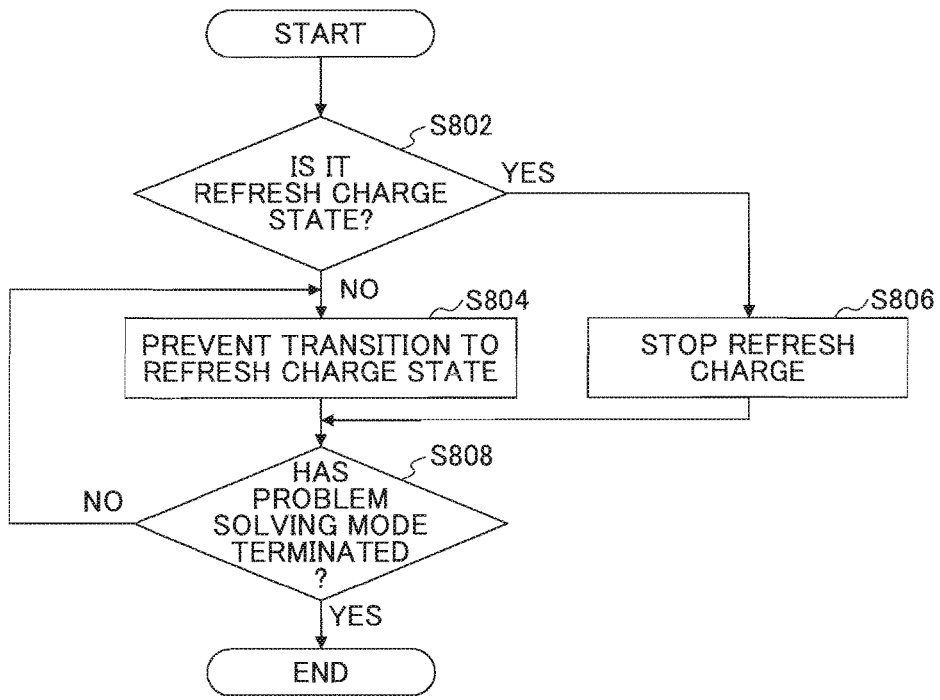
FIG. 8 is a flowchart illustrating another example of a process executed by the charge control ECU 10 when the demand for a transition to a problem solving mode is detected.

FIG. 8 is a flowchart illustrating another example of a process executed by the charge control ECU 10 at the time of the detection of the demand for a transition to a problem solving mode. The process routine illustrated in FIG. 8 is initiated when the demand for a transition to a problem solving mode is detected, and is repeatedly performed every predetermined cycle in the ON state of the ignition switch until the determination result in step S808 becomes affirmative.

In step S802, the vehicle control ECU 10 determines whether the current control state is the refresh charge state. If the current control state is the refresh charge state, the process routine goes to step 806, otherwise the process routine goes to step 804.

In step S804, the vehicle control ECU 10 prevents the transition to the refresh charge state. A way of preventing the same is arbitrary. For example, the charge control ECU 10 may not determine the refresh charge start condition, may determine the refresh charge start condition but may not cause the transition to the refresh charge state even if the refresh charge start condition is met, or may cause the refresh charge start condition not to be met (does not increase the cumulative charge control execution time and the cumulative charge/discharge electricity amount in the problem solving mode, for example). It is noted that, in the case where the charge control ECU 10 determines the refresh charge start condition but does not cause the transition to the refresh charge state even if the refresh charge start condition is met, the charge control ECU 10 may cause the transition to the refresh charge state immediately after the completion of the problem solving mode. When the process in step S804 is terminated, the process routine goes to step 808.

In step S806, the charge control ECU 10 stops the refresh charge. In other words, the vehicle control ECU 10 causes the transition from the refresh charge state to the charge control execution state. When the process in step S806 is terminated, the process routine goes to step 808.

In step S808, the charge control ECU 10 determines whether the problem solving mode has been ended. If the problem solving mode has been ended, the process routine illustrated in FIG. 8 and related to the demand for the transition to the problem solving mode at this time is ended. On the other hand, if the problem solving mode still continues, the process routine returns to step S804 and thus the state in which the transition to the refresh charge state is prevented is kept.

According to the process illustrated in FIG. 8, it becomes possible to prevent the charge control not being performed in the problem solving mode due to the refresh charge state. In other words, the refresh charge can be completely removed from candidates of the factors that cause the charge control not to be performed. As a result of this, it becomes easier to identify the reason why the charge control is not performed.

Further, if the current values of the cumulative charge control execution time and the cumulative charge/discharge electricity amount are kept without the increment in step S804, the refresh charge may be performed at appropriate timing after the completion of the problem solving mode. As a result of this, it becomes possible to prevent the charge control not being performed in the problem solving mode due to the refresh charge state, while reducing the probability that the refresh charge is not performed over a long period after the problem solving mode.

Figure 9:
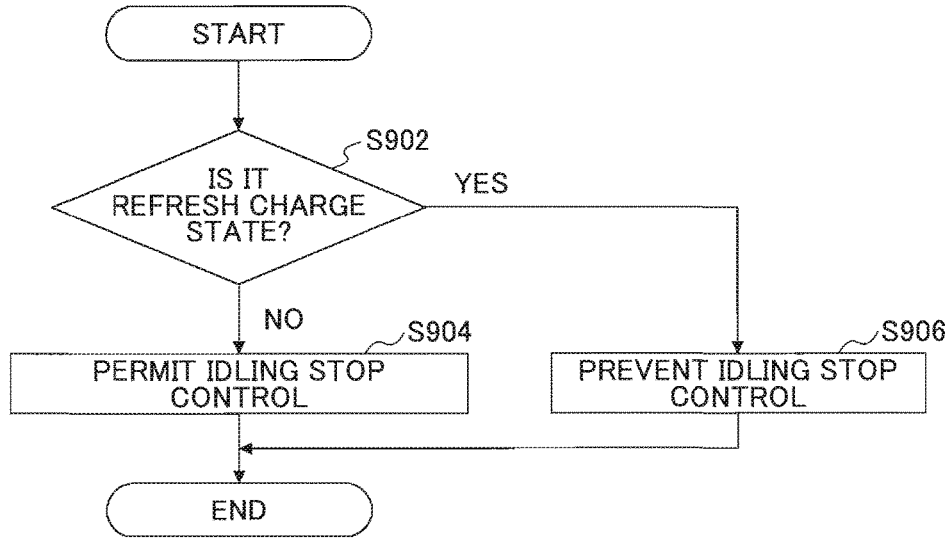
FIG. 9 is an example of a flowchart of a process executed by a charge control ECU 10 related to idling stop control.

FIG. 9 is an example of a flowchart of a process executed by the charge control ECU 10 related to idling stop control. The process routine illustrated in FIG. 9 may be performed repeatedly every predetermined cycle in the ON state of the ignition switch.

In step S902, the vehicle control ECU 10 determines whether the current control state is the refresh charge state.

If the current control state is the refresh charge state, the process routine goes to step 906, otherwise the process routine goes to step 904.

In step S904, the charge control ECU 10 transmits information representing the permission of the idling stop control to the idling stop control ECU 30. This process may be implemented by setting an idling stop control permission flag in its ON state, for example. Alternatively, the idling stop control ECU 30 may refer to the charge control state determined by the charge control state determination part 12. When the idling stop control is in its ON state, for example, the idling stop control ECU 30 starts the idling stop control upon other predetermined idling stop start conditions being met.

In step S906, the charge control ECU 10 transmits information representing the prevention of the idling stop control to the idling stop control ECU 30. This process may be implemented by setting an idling stop control permission flag in its OFF state, for example. Alternatively, the idling stop control ECU 30 may refer to the charge control state determined by the charge control state determination part 12. When the idling stop control is in its OFF state, for example, the idling stop control ECU 30 does not start the idling stop control (i.e., does not stop the engine even if other predetermined idling stop start conditions are met.

By the way, like the charge control described above, the idling stop control is not performed when the charge control state is the refresh charge state, but may not be performed due to other factors. In other words, a prevented state of the idling stop control is implemented in the refresh charge state; however, the prevented state of the idling stop control may also be implemented in a state other than the refresh charge state. For example, the prevented state of the idling stop control may be implemented due to the failure of the hardware resources (the failure of the alternator 40, for example).

Thus, according to the process illustrated in FIG. 7 or FIG. 8 described above, the effects can be obtained not only for the charge control but also for the idling stop control. In other words, the probability that the idling stop control is not performed in the problem solving mode due to the refresh charge state can be reduced or eliminated. As a result of this, it becomes easy to identify the reason why the charge control is not performed. For example, if the inspector inputs the demand for a transition to the problem solving mode in order to identify the reason why the idling stop control is not performed, the refresh charge is suppressed (including "prevented") as described above. As a result of this, the probability that the idling stop control is not performed due to the refresh charge state is reduced or eliminated in the problem solving mode during the period in which the vehicle is actually traveling. Thus, if the state in which the idling stop control is not performed still continues, the inspector can determine that some factors other than the refresh charge are the cause. On the other hand, if the ng stop control is performed in the problem solving mode, it can be determined that the idling stop control was not performed due to the refresh charge and not due to other factors such as a failure of the hardware resources.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention. Further, all or part of the components of the embodiments described above can be combined.

For example, according to the embodiment, the elapsed time from the latest execution of the refresh charge is considered as the refresh charge start condition; however, a travel distance from the latest execution of the refresh charge may be considered. For example, the refresh charge start condition may be met when the travel distance from the latest execution of the refresh charge is greater than or equal to a predetermined distance.

Further, in the embodiment described above, the cumulative charge/discharge electricity amount is considered to determine the refresh charge start condition; however, instead of the cumulative charge/discharge electricity amount, only a cumulative amount of a charge current or a cumulative amount of a discharge current may be considered, or a ratio between the cumulative amount of a charge current and the cumulative amount of a discharge current, etc., may be considered.

Further, the embodiment described above is related to the vehicle in which the charge control and the idling stop control are performed; however, the embodiment can be applied to another vehicle in which only one of the charge control and the idling stop control is performed.

The present application is based on Japanese Priority Application No. 2013-251491, filed on Dec. 4, 2013, the entire contents of which are hereby incorporated by reference.

DESCRIPTION OF REFERENCE SYMBOLS 1 control system
10 charge control ECU
12 charge control state determination part
14 battery capacity calculation part
16 electric power generation voltage instruction part
30 idling stop control ECU
40 alternator
60 battery
70 vehicle tool

The invention claimed is:

1. A charge control apparatus, comprising a control device configured to execute a refresh charge to fully charge a battery upon a predetermined refresh charge start condition being met, and execute a predetermined control according to a vehicle travel state under a situation where the control device does not execute the refresh charge, the predetermined control involving at least one of charging and discharging the battery, wherein
    the control device suppresses the refresh charge when the control device detects a predetermined vehicle operation and a predetermined input from an external device,
    the external device is portable, and
    the predetermined input is an input that represents a demand for a transition to a problem solving mode.

2. The charge control apparatus of claim 1, wherein, when the control device detects the predetermined vehicle operation during an execution of the refresh charge, the control device stops executing the refresh charge.

3. The charge control apparatus of claim 1, wherein, when the control device detects the predetermined vehicle operation under a situation where the control device does not execute the refresh charge, the control device prevents the refresh charge until a predetermined condition is met.

4. The charge control apparatus of claim 1, wherein the predetermined control includes at least one of an idling stop control to be executed in a vehicle stop state or traveling state, and a charge control to control an alternator according to a travel state of the vehicle.

5. The charge control apparatus of claim 1, wherein the predetermined vehicle operation is a pedal operation including at least one operation which would not normally be performed by a driver.

6. A charge control apparatus, comprising a control device configured to execute a refresh charge to fully charge a battery upon a predetermined refresh charge start condition being met, and execute a predetermined control according to a vehicle travel state under a situation where the control device does not execute the refresh charge, the predetermined control involving at least one of charging and discharging the battery, wherein:
the control device suppresses the refresh charge when the control device detects at least one of a predetermined input from an external device and a predetermined vehicle operation including at least one operation that would not be normally performed by a driver,
the predetermined refresh charge start condition is met upon a counter value, incremented according to an elapsed time or a travel distance from a completion of the latest execution of the refresh charge, exceeding a predetermined threshold, and
the counter value is decreased to a predetermined counter value or kept without being incremented at a current value until a predetermined condition is met, when at least one of the predetermined input and the predetermined vehicle operation is detected.

7. The charge control apparatus of claim 6, wherein the counter value is decreased to the predetermined counter value when at least one of the predetermined input and the predetermined vehicle operation is detected, and
the predetermined counter value is a predetermined value, if the counter value at a timing when at least one of the predetermined input and the predetermined vehicle operation is detected is greater than or equal to the predetermined value.

8. The charge control apparatus of claim 7, wherein the predetermined counter value is 0, if the counter value at a timing when at least one of the predetermined input and the predetermined vehicle pedal operation is detected is not greater than or equal to the predetermined value.

9. The charge control apparatus of claim 6, wherein the predetermined vehicle operation is a pedal operation.

10. A charge control apparatus, comprising a control device configured to execute a refresh charge to fully charge a battery upon a predetermined refresh charge start condition being met, and execute a predetermined control according to a vehicle travel state under a situation where the control device does not execute the refresh charge, the predetermined control involving at least one of charging and discharging the battery, wherein:
the control device suppresses the refresh charge when the control device detects at least one of a predetermined input from an external device and a predetermined vehicle operation including at least one operation that would not be normally performed by a driver,
the predetermined refresh charge start condition is met upon a cumulative charge/discharge electricity amount of the battery, accumulated from a completion of the latest execution of the refresh charge, exceeding a predetermined threshold, the cumulative charge/discharge electricity amount being obtained by integrating in time absolute values of a charge current and a discharge current of the battery, and
the cumulative charge/discharge electricity amount is decreased to a predetermined value or kept at a current value without being accumulated until a predetermined condition is met, when at least one of the predetermined input and the predetermined vehicle operation is detected.

* * * * *